(12) United States Patent
Dawson et al.

(10) Patent No.: US 9,355,039 B2
(45) Date of Patent: *May 31, 2016

(54) APPLICATION-DIRECTED MEMORY DE-DUPLICATION

(71) Applicant: GLOBALFOUNDRIES INC., Grand Cayman (KY)

(72) Inventors: Michael H. Dawson, Ottawa (CA); Arun K. Iyengar, Yorktown Heights, NY (US); Graeme Johnson, Ottawa (CA)

(73) Assignee: GLOBALFOUNDRIES INC., Grand Cayman (KY)

( * ) Notice: Subject to any disclaimer, the term of this patent is extended or adjusted under 35 U.S.C. 154(b) by 91 days.

This patent is subject to a terminal disclaimer.

(21) Appl. No.: 13/964,689

(22) Filed: Aug. 12, 2013

(65) Prior Publication Data

US 2014/0331017 A1 Nov. 6, 2014

Related U.S. Application Data

(63) Continuation of application No. 13/875,702, filed on May 2, 2013.

(51) Int. Cl.
*G06F 12/10* (2006.01)
*G06F 12/08* (2006.01)
*G06F 9/455* (2006.01)

(52) U.S. Cl.
CPC ............ *G06F 12/10* (2013.01); *G06F 9/45558* (2013.01); *G06F 12/08* (2013.01); *G06F 2009/45583* (2013.01); *G06F 2212/1016* (2013.01); *G06F 2212/1044* (2013.01); *G06F 2212/152* (2013.01)

(58) Field of Classification Search
None
See application file for complete search history.

(56) References Cited

U.S. PATENT DOCUMENTS

| 6,075,938 | A  | * | 6/2000  | Bugnion et al. ................. 703/27 |
|-----------|-----|---|---------|----------------------------------------|
| 6,789,156 | B1 | * | 9/2004  | Waldspurger ..................... 711/6 |
| 8,191,065 | B2 |   | 5/2012  | Frank                                  |
| 8,225,317 | B1 |   | 7/2012  | Chiueh et al.                          |
| 8,954,399 | B1 | * | 2/2015  | Balakrishnan et al. ....... 707/692    |
| 2006/0179050 | A1 | * | 8/2006 | Giang et al. ...................... 707/5 |
| 2010/0161929 | A1 |   | 6/2010 | Nation et al.                         |
| 2011/0022812 | A1 |   | 1/2011 | van der Linden et al.                 |
| 2011/0265083 | A1 | * | 10/2011 | Davis ............................... 718/1 |

(Continued)

OTHER PUBLICATIONS

Address. (2003). In B. Pfaffenberger, Webster's New World&Trade: Computer Dictionary. Hoboken, NJ: Wiley. Retrieved from http://search.credoreference.com/content/entry/webstercom/address/0.*

(Continued)

*Primary Examiner* — Brian Peugh
*Assistant Examiner* — Dustin Bone
(74) *Attorney, Agent, or Firm* — Scully Scott Murphy and Presser

(57) ABSTRACT

In a computing system including an application executing on top of a virtualization control layer, wherein the virtualization control layer maps portions of a virtual memory to portions of a physical memory, an apparatus for managing memory configured to: identify, by the application, a range of virtual memory whose probability of being replicated in the virtual memory exceeds a given threshold; obtain, by the application, at least one memory address corresponding to the range of virtual memory; and pass, from the application to the virtualization control layer, an identifier for the range of virtual memory and the memory address corresponding to the range of virtual memory, wherein the identifier is useable by the virtualization control layer to identify similar ranges within the virtual memory.

18 Claims, 4 Drawing Sheets

(56) References Cited

U.S. PATENT DOCUMENTS

| | | |
|---|---|---|
| 2012/0017027 A1 | 1/2012 | Baskakov et al. |
| 2012/0030477 A1 | 2/2012 | Lu et al. |
| 2012/0173656 A1 | 7/2012 | Sorenson, III |
| 2013/0054927 A1* | 2/2013 | Raj et al. .................. 711/170 |
| 2013/0198459 A1* | 8/2013 | Joshi et al. ................ 711/130 |
| 2015/0039818 A1* | 2/2015 | Yadav et al. ............... 711/103 |

OTHER PUBLICATIONS

D. Gupta et al., "Difference Engine: Harnessing Memory Redundancy in Virtual Machines," 8th USENIX Symposium on Operating Systems Design and Implementation, Dec. 2008, pp. 309-322.

C.R. Attanasio, "Virtual Control Storage-Security Measures in VM/370," IBM Systems Journal, Mar. 1979, pp. 93-110, vol. 18, No. 1.

Y.-S. Pan et al., "Hypervisor Support for Efficient Memory De-Duplication," IEEE 17th International Conference on Parallel and Distributed Systems (ICPADS), Dec. 2011, pp. 33-39.

S. Kim et al., "Group-Based Memory Deduplication for Virtualized Clouds," Euro-Par 2011: Parallel Processing Workshops—CCPI, CGWS, HeteroPar, HiBB, HPCVirt, HPPC, HPSS, MDGS, ProPer, Resilience, UCHPC, VHPC, Aug.-Sep. 2011, Bordeaux, France.

B. Frank et al., "Using Discontiguous Shared Segments and XIP2 Filesystems with Oracle Database 10g on Linux for IBM System z," IBM Redbook Publication, ibm.com/redbooks, Jun. 2006, 92 pages.

* cited by examiner

APPLICATION-DIRECTED MEMORY DE-DUPLICATION

CROSS-REFERENCE TO RELATED APPLICATION(S)

This application is a Continuation of pending U.S. application Ser. No. 13/875,702 filed on May 2, 2013, the disclosure of which is incorporated herein by reference.

FIELD

The present application relates to data management in a computing system and, more particularly, to memory de-duplication.

BACKGROUND

Memory de-duplication allows a single physical page of memory to be shared by multiple virtual pages of memory that have identical content across different virtual machines (VMs) running under the same hypervisor. Since fewer physical pages are needed to back the same number of virtual pages, less real memory is required to support the same application load. A related technique is often used within a single operating system instance in order to share physical pages backing virtual pages for individual processes.

The potential savings in total memory required has spurred some operating system designs to implement de-duplication. Existing implementations rely on scanning pages either in the background, or when directed, against the rest of the pages in the system in order to find ones that are the same. These operating system designs support hints as to what pages might be good candidates for de-duplication such that these pages are either compared immediately against the rest of the pages in the system or on a priority basis. With or without hints, matches are found though a search against all other pages in the set being considered for de-duplication. Even in operating systems where de-duplication is not supported, mechanisms are typically in place in order to try to share pages across multiple VMs.

The cost of scanning all pages is not insignificant, and existing implementations reflect this cost. For example, some operating systems defer scanning pages until they have "settled" (i.e., reached a steady state) for a period of time (e.g., minutes), while other operating systems choose not to implement de-duplication at all. The cost can also be a significant issue for some computing platforms, in particular, platforms where customers are charged based on CPU cycles.

While the hints in existing implementations can give priority to some pages in terms of scanning, they do not reduce the overall cost because the pages are still scanned against the rest of the pages in the set being considered for de-duplication. The existing approach of scanning through all pages to find duplicates also becomes less effective as page sizes grow since the chance of a match on a per page basis is lower. As a result of this problem, some hypervisors which support de-duplication defer the process for large pages until the system is already under memory pressure. In these cases, one cannot assess the benefits that will be achieved when pages are de-duplicated making it harder to figure out and provision the amount of memory required.

Thus, existing de-duplication implementations include, but are not limited to, one or more of the following drawbacks: (i) without hints, duplicates are not found immediately because pages are allowed to settle before they are considered for de-duplication; (ii) there may be a delay from the start of scanning before duplicates are found because many pages may have to be compared before the matching pages are found; (iii) CPU cycles are consumed comparing pages that are not matches; (iv) de-duplication may be deferred until the system is under memory pressure, making it harder to recover in time to avoid performance degradations; and (v) pages may not be de-duplicated if there is no memory pressure, making it more difficult to figure out and provision the amount of memory required.

SUMMARY

Embodiments of the invention provide techniques for memory de-duplication.

For example, in one embodiment, a method comprises the following step. In a computing system comprised of an application executing on top of a virtualization control layer, wherein the virtualization control layer maps portions of a virtual memory to portions of a physical memory, a method for managing memory comprising: identifying, by the application, a range of virtual memory whose probability of being replicated in the virtual memory exceeds a given threshold; obtaining, by the application, at least one memory address corresponding to the range of virtual memory; and passing, from the application to the virtualization control layer, an identifier for the range of virtual memory and the memory address corresponding to the range of virtual memory, wherein the identifier is useable by the virtualization control layer to identify similar ranges within the virtual memory.

In another embodiment, a method comprises the following step. In a computing system comprised of an application executing on top of a virtualization control layer, wherein the virtualization control layer maps portions of a virtual memory to portions of a physical memory, a method for managing memory comprising: receiving, at the virtualization control layer from the application, an identifier for a range of virtual memory whose probability of being replicated in the virtual memory exceeds a given threshold and at least one memory address corresponding to the range of virtual memory; and using, by the virtualization control layer, the identifier to identify similar ranges within the virtual memory.

In yet another embodiment, a computer program product is provided which comprises a processor-readable storage medium having encoded therein executable code of one or more software programs. The one or more software programs when executed by a processor of a processing device implement steps of one or more of the above-described methods.

In a further embodiment, an apparatus comprises a memory and a processor operatively coupled to the memory and configured to perform steps of one or more of the above-described methods.

These and other objects, features, and advantages of the present invention will become apparent from the following detailed description of illustrative embodiments thereof, which is to be read in connection with the accompanying drawings.

DETAILED DESCRIPTION

Embodiments of the invention directed to memory de-duplication will be described herein below in the context of an illustrative virtualized host computing system environment. However, it is to be understood that the memory de-duplication techniques described herein are not limited to this specific type of illustrative virtualized host computing system environment but are more generally applicable to any virtualized computing system environment that would benefit from such improved memory de-duplication techniques. For example, while some embodiments will be described herein with a hypervisor executing directly on top of the hardware of the host computing system (referred to as a "type 1" hypervisor), some embodiments of the invention also include configurations whereby the hypervisor executes on top of an operating system of the host computing system which executes on top of the host hardware (referred to as a "type 2" hypervisor). Further, some embodiments of the invention include hybrids of type 1 and type 2 hypervisor configurations. Still further, some embodiments of the invention provide such improved memory de-duplication to an operating system in a computing system without a hypervisor.

Thus, as used herein, the hypervisor, the operating system, or some combination thereof, may be more generally referred to as a "virtualization control layer."

As used herein, the phrase "virtualized host computing system" refers to a physical computing system that hosts one or more logical processing components, e.g., one or more virtual machines (VMs).

As used herein, the term "memory de-duplication" refers to a process of avoiding and/or undoing duplication of portions of memory, i.e., avoiding or undoing two or more portions of memory storing the same data. For example, in the case of a virtualized host computing system which includes virtual memory and physical memory, memory de-duplication seeks to avoid or undo two or more portions of physical memory being allocated for identical portions of virtual memory, as will be further explained below.

Figure 1:
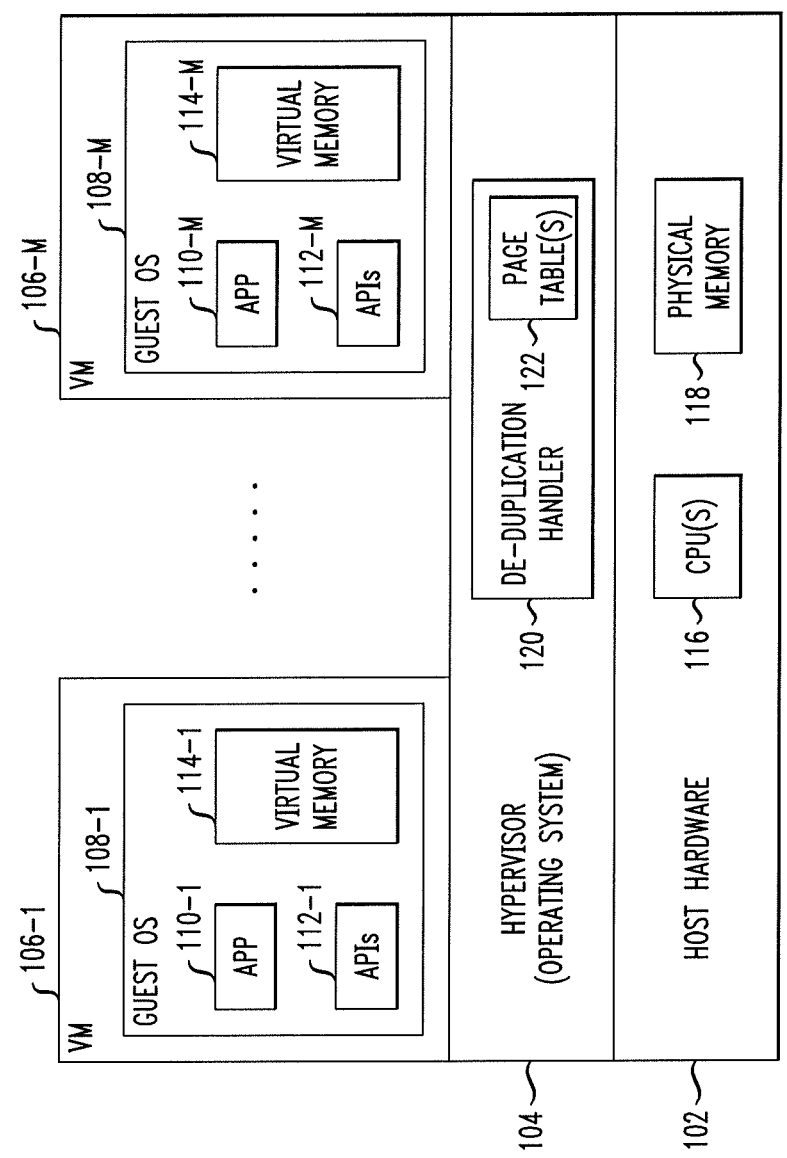
FIG. 1 illustrates a block diagram of a virtualized host computing system with memory de-duplication in accordance with an embodiment of the invention.

FIG. 1 shows a virtualized host computing system with memory de-duplication functionality in accordance with an embodiment of the invention. Virtualized host computing system 100 is shown in FIG. 1 in terms of functional layers whereby a layer directly above another layer is considered to execute (run) on top of that other layer (interact directly therewith). Thus, as shown, the system 100 includes host hardware 102, a hypervisor 104 executing on top of the host hardware 102, and a plurality of VMs 106-1 through 106-M executing on top of the hypervisor 104. As mentioned above, in alternative configurations, a host operating system can reside functionally between the host hardware 102 and the hypervisor 104. Also, the hypervisor 104 and the host operating system may form a hybrid layer in other alternative embodiments. Still further, in alternative embodiments, the computing system may have no hypervisor layer at all whereby the memory de-duplication functionality is handled by the host operating system.

As shown, each of VMs 106-1 through 106-M includes a guest operating system (i.e., guest operating system 108-1 through 108-M, respectively). As is known, the hypervisor 104 affords the ability for multiple guest operating systems to run concurrently on a single host computing system and share hardware resources (host hardware 102) with each other. Executing within each guest operating system is an application (i.e., applications 110-1 through 110-M, respectively), one or more application programming interfaces (i.e., APIs 112-1 through 112-M, respectively), and a virtual memory (i.e., virtual memories 114-1 through 114-M, respectively). An application may comprise one or more software programs designed to perform one or more functions (which depend on the specific purpose for which the application is designed). A virtual memory is typically broken up into multiple virtual memory pages. A virtual memory page is a portion of a virtual memory identified by a set (or range) of virtual memory addresses. In one embodiment, a virtual page is defined by a start address and a size of the virtual page.

Host hardware 102 includes physical processing components such as one or more CPUs (central processing units) 116 and a physical memory 118. The physical memory 118 refers to the memory of one or more physical storage devices of the host computing system 100. Like virtual memory, physical memory is also typically broken up into multiple memory pages, but in this case, multiple physical memory pages. Here too, a physical memory page is a portion of physical memory identified by a set (or range) of physical memory addresses. In one embodiment, a physical page is defined by a start address and a size of the physical page. As is known, the physical memory pages are used to "back" virtual memory pages, i.e., data is not actually stored in a virtual memory but rather virtual memory locations point to physical memory locations where data is actually stored.

By way of example, a main goal of memory de-duplication is to allocate a single physical memory page to be shared by multiple virtual memory pages that have identical content across different VMs running under the same hypervisor. As will be explained in further detail herein below, a de-duplication handler 120 using page table(s) 122, in hypervisor 104 of FIG. 1, manages the correspondence between virtual memory pages and physical memory pages and provides the memory de-duplication functionality. Additionally, it is to be understood that memory de-duplication embodiments of the invention extend to the concept of "delta encoding" in which pages in memory are slightly different and, as such, each memory page can be stored as a base page and an offset, wherein the offset represents the difference between the two memory pages. Thus, memory savings is achieved by de-duplicating base pages.

It is to be understood that although only a single hypervisor 104 is shown in the example of FIG. 1, a given embodiment of the invention may include multiple hypervisors, each running on its own portion of host hardware 102. Furthermore, in alternative embodiments, virtualized host computing system 100 may be implemented as more than one computing system wherein the multiple computing systems that comprise the host computing system 100 are distributed with respect to one another.

Accordingly, as will be explained in detail below, embodiments of the invention provide improved memory de-duplication. By way of example only, memory de-duplication embodiments: reduce the cost of de-duplicating memory by only comparing memory pages with a very high likelihood of a match (preferably 100% likelihood); scan duplicate memory pages as soon as they are created; and do not require prior knowledge about artifacts that might be shared, e.g., Java™ artifacts (Oracle Corporation, Redwood City, Calif.).

Existing memory de-duplication approaches are not able to achieve these advantages because, inter alia, they do not have the information to do so. Embodiments of the invention realize that the information that is required is only known to layers above the hypervisor 104 (i.e., by the guest operating system 108 and/or application 110), and more information is required than can be passed by the hints supported in existing approaches.

Embodiments of the invention allow one or more layers above the hypervisor to provide specific information as to what virtual pages are duplicates of other pages. In one embodiment, at least one such higher layer is configured to give the hypervisor a range of one or more pages along with an identifier (e.g., referred to as a match_token) which identify the range. The hypervisor only compares the page range provided against other ranges which were provided with the same match_token. The higher layer(s) selects its tokens such that multiple processes either in the same/different guest operating systems can provide the same match_token for pages which will be duplicates. This allows the efficient de-duplication in the hypervisor (or other layer such as the host operating system) were a set of memory pages can be shared.

Accordingly, as will be further explained herein, illustrative memory de-duplication embodiments, inter alia, include: (i) passing a match_token and page range to the hypervisor to direct de-duplication so that the system only compares pages that are duplicates of each other (the system still does a comparison to validate that the pages are the same); (ii) one or more APIs to allow the match_token and page range to be passed down from the application to the guest operating system, and then from the guest operating system to the hypervisor at runtime; (iii) one or more APIs that allow applications running in a Java™ environment to easily direct de-duplication of Java™ artifacts; and (iv) techniques for selecting match_tokens that can be used across guest operating systems.

Figure 2:
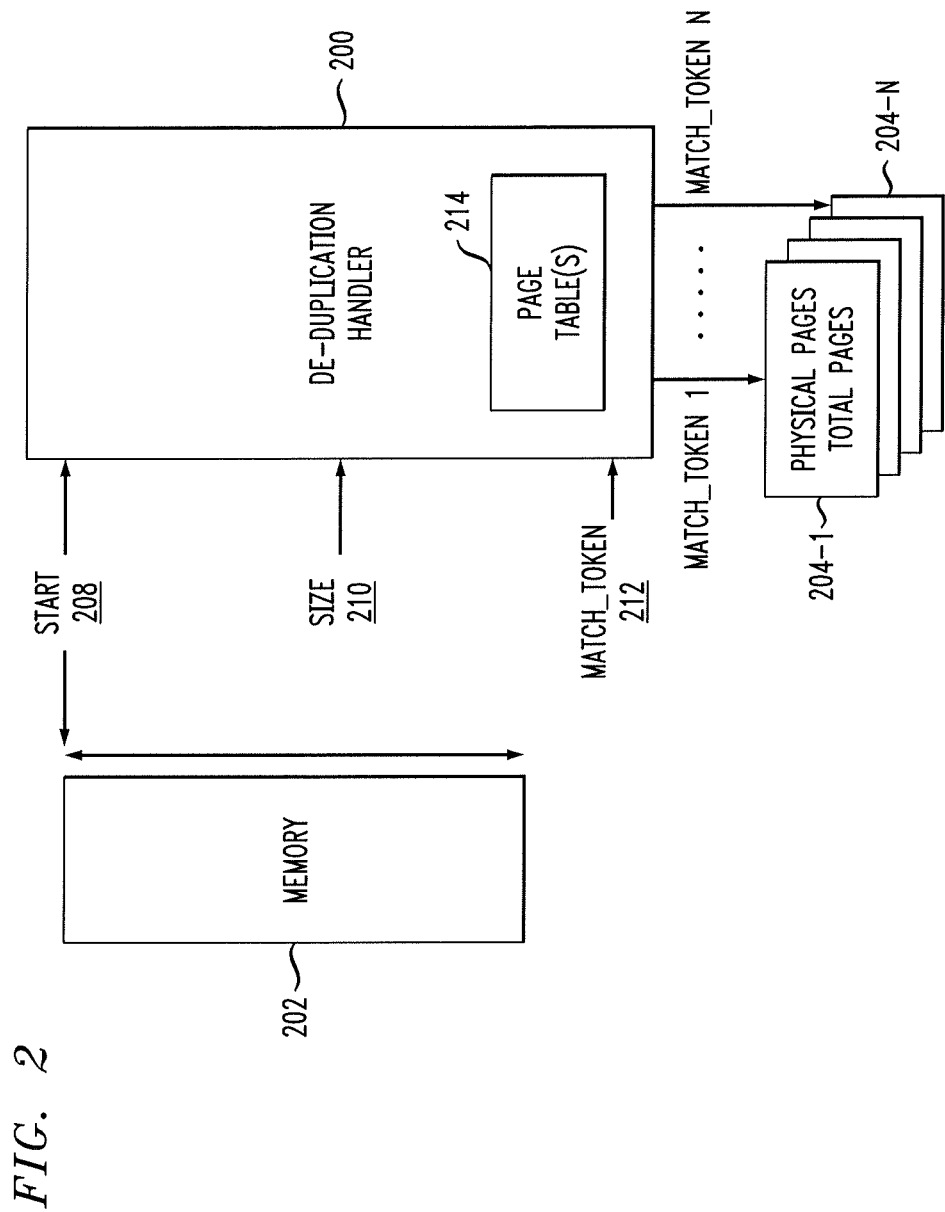
FIG. 2 illustrates a block diagram of a memory de-duplication module in accordance with an embodiment of the invention.

FIG. 2 illustrates a memory de-duplication module in accordance with an embodiment of the invention. It is to be understood that de-duplication handler (module) 200 corresponds to de-duplication handler 120 in FIG. 1. While it has been mentioned above that the de-duplication handler is implemented by the hypervisor in illustrative embodiments, the module can be alternatively implemented in other layers of the virtualized host computing system.

Figure 3A:
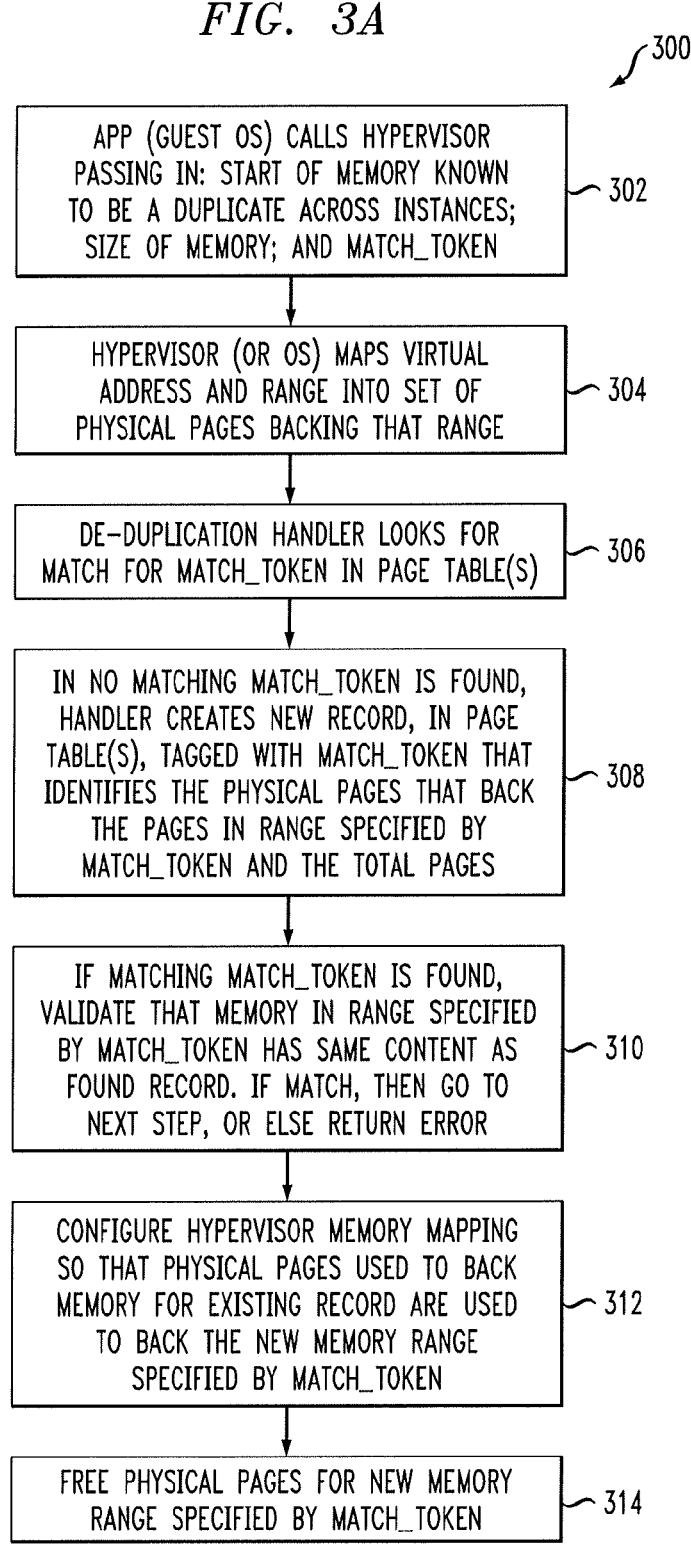
FIG. 3A illustrates a flow diagram of a memory de-duplication methodology in accordance with an embodiment of the invention.

The following illustrative description assumes the de-duplication handler 200 is implemented in the hypervisor. FIG. 3A illustrates a memory de-duplication methodology 300, in accordance with an embodiment of the invention, in conjunction with the de-duplication handler 200 of FIG. 2. The methodology 300 is referred to as "application-directed" memory de-duplication since, in this embodiment, the application provides the hypervisor (i.e., de-duplication handler 200) with the information used to implement the improved memory de-duplication described herein.

In this embodiment, the hypervisor (104 of FIG. 1) provides each guest operating system (108-1 through 108-M of FIG. 1) with an API (112-1 through 112-M of FIG. 1) that is used to pass, for at least one page of virtual memory 202 (from one of virtual memory 114-1 through 114-M of FIG. 1), a start address 208 of the virtual page, a size 210 of the virtual page, and a match_token 212 identifying the virtual page. This information is passed to the de-duplication handler, in step 302 of FIG. 3, for each virtual page identified by a given application running in a given guest operating system. One or more virtual memory pages represent a region or range of a given virtual memory.

For example, assuming the Java™ environment, a Java™ virtual machine (JVM) places read-only artifacts in a shared memory region to amortize the JVM footprint across processes. This memory region would also be shareable across virtual guest operating systems. Thus, in accordance with the memory de-duplication methodology described herein, the JVM is configured to supply a match_token (e.g., JVM_shared_data_<jvm_version>) to accelerate page de-duplication.

In an alternative embodiment, the start address 208, the size 210, and the match_token 212 can be passed to the de-duplication handler 200 from the guest operating system rather than directly from the application, although it is still preferred that the application determines the information to be passed.

In step 304, the hypervisor 104 (or operating system) maps, via a mapping structure, the virtual address and range into the set of physical memory pages backing that range of virtual memory.

In step 306, the de-duplication handler 200 searches for matches, in page table(s) 214, for the match_token passed thereto in step 302. Page table(s) 214 may also be considered a mapping structure. If no matching match_token is found, in step 308, the de-duplication handler 200 creates a new record in the page table(s) 214 tagged with the match_token passed in step 302 that identifies the physical pages 204-1 through 204-N backing the virtual pages in the range specified, as well as the total number of pages. Alternatively, the hypervisor can store information it needs to later find the physical pages for the range specified (e.g., start address and total length).

If a match is found for the match_token passed to the de-duplication handler, the de-duplication handler 200 validates, in step 310, that the memory in the range specified has the same contents as that for the existing found record. If the memory content matches, then the methodology 300 continues, otherwise an error message is returned.

In step 312, a hypervisor memory mapping (mapping structure) is configured so that physical pages used to back the virtual memory for the existing record are used to back the new virtual memory range. In one embodiment, this can be done using memory management unit (MMU) page protection and copy-on-write to handle page separations.

In step 314, the physical pages (204-1 through 204-N) are freed for the given virtual memory range passed to the de-duplication handler 200 in step 302.

Note that, in an alternative embodiment, step 312 can be further enhanced to extend the existing remapping such that the page sizes used to back the virtual memory are modified in order to better allow sharing. This remapping can be done at the hypervisor or operating system level such that no changes are required in end user applications.

For example if an existing record in page table(s) 214 covers a range of 512 k (kilo) bytes backed by a large 2 MB (megabyte) page, the memory mapping may be reconfigured to change the page size used for the 2 MB range so that 64 k pages are used instead, allowing the 512 k byte record to be de-duplicated as eight 64 k pages.

As mentioned above, one or more APIs (112-1 through 112-M of FIG. 1) are provided in the guest operating system. Such APIs can be used to map addresses as seen by the application (110-1 through 110-M of FIG. 1) to addresses seen by the hypervisor (104). However, such APIs may alternatively be provided in the hypervisor or host operating system, as mentioned above.

Such APIs allow applications to specify the start address (208), size (210) and match_token (212) of a given portion of virtual memory. The address specified is the address as seen by the application process. The API (112) in the guest operating system (or elsewhere in alternative embodiments) maps this address to the information needed to identify the pages to the hypervisor in a manner that the hypervisor recognizes. The functionality needed to do the translation is extended in order to be able to translate a number of pages and convey this page information even when the page information as seen by the hypervisor may not be contiguous. That is, the application provides the address of a virtual page and a length, but this needs to be mapped to addresses for physical pages (one or more of which are likely not contiguous and cannot be represented as a start address and length). Thus, the API provides the capability of generating this mapping.

Embodiments of the invention also include one or more APIs (112-1 through 112-M) that can be used to identify Java™ artifacts (one example of a read only program artifact) that can be de-duplicated. Examples include, but are not limited to: (i) direct byte buffers; (ii) memory mapped files; and (iii) pre-compiled code. In these APIs, the match_token can either be specified by the application if it wants to specify a unique identifier or can be automatically generated for the caller using one of the techniques further outlined below, e.g. void com.ibm.jvm.Deduplicate.byteBuffer (DirectByffer b, String match_token).

It is to be appreciated that the application is configured to select a match_token. For example, when a JVM sends a pre-populated shared class cache, it can be assigned a unique identifier which can be used as the match_token each time that cache is loaded into memory. If the same file is loaded using a shared file system, the name of the file can be provided as the match_token.

Leveraging application-specific domain knowledge provides the lowest overhead as there is no runtime cost required to generate the match_token. In cases where there is no clear match_token, it is still known that the contents of the memory will be the same for a given artifact. Since the application is involved in directing the de-duplication, the application can generate a match_token from the memory content when the master copy of the artifact is created, and store this along with the artifact itself (for example, store the match_token as a header in a file that will be later shared). The instance of the application in each guest operating system can then read the match_token along with the memory for the artifact and provide it to the hypervisor. Since generation is done only once for the artifact, a strong hash algorithms can be used to generate a match_token from the memory content. In one embodiment, the MD5 hash algorithm may be used where the likelihood of collisions is close to zero. However, other hash algorithms can be employed.

Embodiments of the invention can also be used in conjunction with delta encoding. In this scenario, match tokens are used to identify similar but not necessarily identical pages. Delta encoding is used to encode similar but not identical pages having the same match_token using a base page and deltas off of the base page. For similar pages, this results in considerably less space overhead than storing a separate complete copy of each page.

Embodiments of the invention can also be used to achieve sharing among multiple processes or VMs. In this scenario, the same match_token is used by each process or VM that wants to share a copy of the same object. In this case, not all of the processes or VMs need to instantiate a copy of the object. One copy of the object corresponding to the match_token needs to be instantiated. Other processes and VMs can then share a copy of the object.

Accordingly, embodiments of the invention provide at least two methods for dealing with updates to shared pages. In one approach, an update to a shared page results in a separate copy of the page for the process or VM that is doing the update. In another approach, the update is made directly in place to the shared page. All process or VMs see the updated version of the page. This is appropriate for situations when a data object is shared across multiple process or VMs.

Figure 3B:
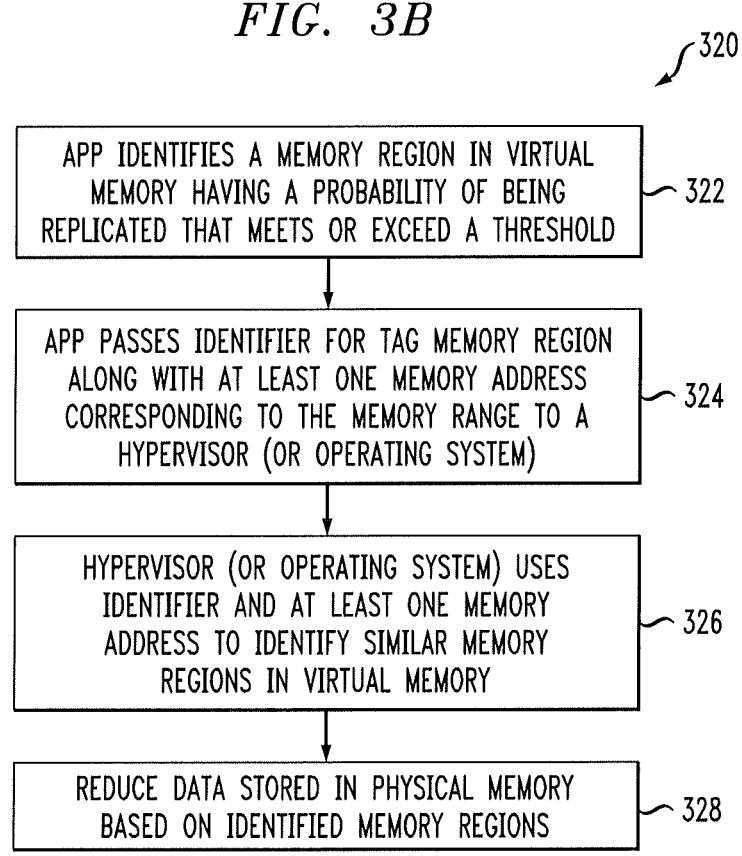
FIG. 3B illustrates a flow diagram of a memory de-duplication methodology in accordance with another embodiment of the invention.

Turning now to FIG. 3B, a memory de-duplication methodology is illustrated in accordance with another embodiment of the invention. In methodology 320, it is assumed that a computer system comprises an application running on top of an operating system or hypervisor wherein the operating system or hypervisor maps virtual pages of memory to physical pages of memory. As explained above, an API is provided to the application which maps a data structure at the application level to at least one virtual memory address where the data structure is stored. The data structure, in one embodiment, is a virtual memory page or some range of memory in the virtual memory. The data structure may alternatively be an object (e.g., a file read into memory) or a Java™ artifact.

In step 322, the application identifies a data structure whose probability of being replicated in memory exceeds a given threshold. One example of the given threshold may be about 90 percent, although embodiments of the invention are not intended to be limited to any specific threshold. The application uses the API to obtain at least one virtual memory address corresponding to the data structure.

In step 324, the application passes an identifier (i.e. the match_token) for the data structure and the at least one virtual memory address corresponding to the data structure to the hypervisor (or host operating system). The hypervisor (or host operating system), in step 326, uses the information provided by the application to identify similar pages within the virtual memory. In step 328, data stored in the physical memory of the system is reduced based on the identified memory regions. Step 328 comprises using de-duplication or delta encoding to reduce redundant information in physical memory pages.

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 3B, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-3B, can also include, as described herein, providing a system, wherein the system includes distinct modules (e.g., modules comprising software, hardware or software and hardware). By way of example only, the modules may include but are not limited to the language model conversion module. These and other modules may be configured, for example, to perform the steps described and illustrated in the context of FIGS. 1-3B.

Figure 4:
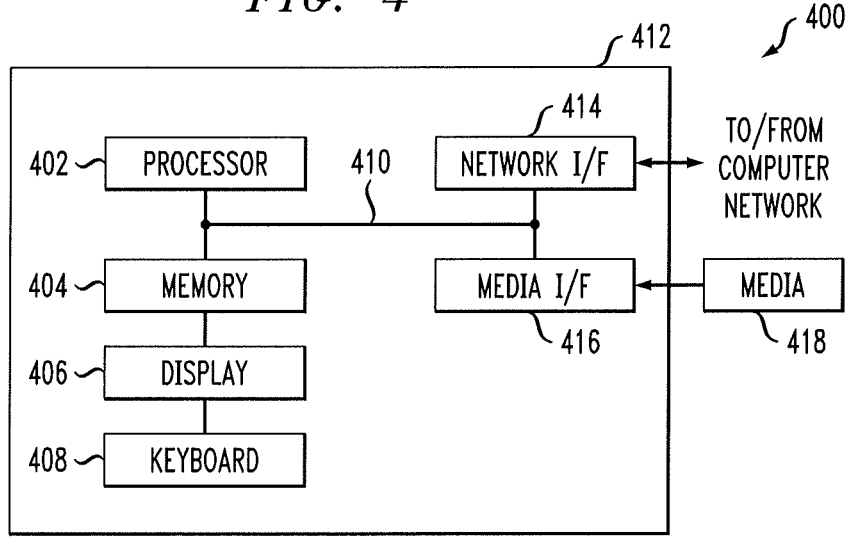
FIG. 4 illustrates a block diagram of a computing system in accordance with which one or more components/steps of memory de-duplication modules/methodologies are implemented, according to an embodiment of the invention.

One or more embodiments can make use of software running on a general purpose computer or workstation. With reference to FIG. 4, such an implementation 400 employs, for example, a processor 402, a memory 404, a display 406 (an example of an output device), and a keyboard 408 (an example of an input device). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 402, memory 404, and input/output devices 406/408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output (I/O) devices 406/408 can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

Accordingly, it is to be understood that the computer architecture 400 shown in FIG. 4 may represent one illustrative physical implementation of the virtualized host computing system 100 as shown in FIG. 1.

As used herein, a server includes a physical data processing system (for example, system 412 as shown in FIG. 4) running a server program. Also, the computer architecture 400 could represent an illustrative implementation of a client, e.g., a laptop, tablet, smartphone, or personal computer.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a computing system comprised of an application executing on top of a virtualization control layer, wherein the virtualization control layer maps portions of a virtual memory to portions of a physical memory, an apparatus for managing memory comprising:
    a memory; and
    a processor coupled to the memory and configured to:
        identify, by the application, a range of the virtual memory whose probability of being replicated in the virtual memory exceeds a given threshold;
        obtain, by the application, at least one memory address corresponding to the range of virtual memory;
        pass, from the application to the virtualization control layer, an identifier for the range of virtual memory and the memory address corresponding to the range of virtual memory, wherein the identifier is useable by the virtualization control layer to identify similar ranges within the virtual memory; and
        provide an application programming interface configured to allow the identifier and the range of virtual memory to be passed down from the application to a guest operating system, and from the guest operating system to the virtualization control layer at runtime;
    wherein the application executes on the guest operating system, and the guest operating system executes on the virtualization control layer; and
    wherein the processor is further configured to use at the virtualization control layer, based at least in part upon the identifier, delta encoding to reduce redundant information in the physical memory.

2. The apparatus of claim 1, wherein the range of virtual memory is used to store one of:
    at least one file read into memory; and
    at least one read only program artifact.

3. The apparatus of claim 1, wherein the virtualization control layer comprises a hypervisor.

4. The apparatus of claim 1, wherein the virtualization control layer comprises an operating system.

5. A computer program product comprising a non-transitory processor-readable storage medium having encoded therein executable code of one or more software programs, wherein the one or more software programs when executed by the at least one processor implement the steps of:
    identifying, by the application, a range of the virtual memory whose probability of being replicated in the virtual memory exceeds a given threshold;
    obtaining, by the application, at least one memory address corresponding to the range of virtual memory;
    passing, from the application to the virtualization control layer, an identifier for the range of virtual memory and the memory address corresponding to the range of virtual memory, wherein the identifier is useable by the virtualization control layer to identify similar ranges within the virtual memory; and
    providing an application programming interface configured to allow the identifier and the range of virtual memory to be passed down from the application to a guest operating system, and from the guest operating system to the virtualization control layer at runtime;
    wherein the application executes on the guest operating system, and the guest operating system executes on the virtualization control layer; and
    wherein the one or more software programs when executed by the at least one processor implement at the virtualization control layer, based at least in part upon the identifier, delta encoding to reduce redundant information in the physical memory.

6. In a computing system comprised of an application executing on top of a virtualization control layer, wherein the virtualization control layer maps portions of a virtual memory to portions of a physical memory, an apparatus for managing memory comprising:
    a memory; and
    a processor coupled to the memory and configured to:
        receive, at the virtualization control layer from the application, an identifier for a range of virtual memory whose probability of being replicated in the virtual memory exceeds a given threshold and at least one memory address corresponding to the range of virtual memory; and
        use, by the virtualization control layer, the identifier to identify similar ranges within the virtual memory; and
        provide an application application programming interface configured to allow the identifier and the range of virtual memory to be passed down from the application to a guest operating system, and from the guest operating m to the virtualization control layer at runtime;
    wherein the application executes on the guest operating system, and the guest operating system executes on the virtualization control layer; and
    wherein the processor is further configured to use at the virtualization control layer, based at least in part upon the identifier, delta encoding to reduce redundant information in the physical memory.

7. The apparatus of claim 6, wherein the range of virtual memory is used to store one of:
    at least one file read into memory; and
    at least one read only program artifact.

8. The apparatus of claim 6, wherein the virtualization control layer comprises a hypervisor.

9. The apparatus of claim 6, wherein the virtualization control layer comprises an operating system.

10. A computer program product comprising a non-transitory processor-readable storage medium having encoded therein executable code of one or more software programs, wherein the one or more software programs when executed by the at least one processor implement the steps of:
   receiving, at the virtualization control layer from the application, an identifier for a range of virtual memory whose probability of being replicated in the virtual memory exceeds a given threshold and at least one memory address corresponding to the range of virtual memory;
   using, by the virtualization control layer, the identifier to identify similar ranges within the virtual memory; and
   providing an application programming interface configured to allow the identifier and the range of virtual memory to be passed down from the application to a guest operating system, and from the guest operating system to the virtualization control layer at runtime; and
   wherein the application executes on the guest operating system, and the guest operating system executes on the virtualization control layer; and
   wherein the one or more software programs when executed by the at least one processor implement at the virtualization control layer, based at least in part upon the identifier, delta encoding to reduce redundant information in the physical memory.

11. The apparatus of claim 1, wherein the identifier is useable by the virtualization control layer to limit comparison of memory pages to each other to particular memory pages.

12. The apparatus of claim 1, wherein the identifier is useable by the virtualization control layer to determine that the similar ranges within the virtual memory are likely to occur.

13. The apparatus of claim 1, wherein the processor is further configured to use at the virtualization control layer, based at least in part upon the identifier and the memory address corresponding to the range of virtual memory, delta encoding to reduce redundant information in the physical memory.

14. The apparatus of claim 1, wherein the delta encoding operates using an offset that represents a difference from a base memory page.

15. The apparatus of claim 14, wherein redundant information is reduced by de-duplicating a plurality of base memory pages.

16. The apparatus of claim 1, wherein the identifier passed by the application is selected by the application such that the identifier is the same as an identifier from another process in the guest operating system.

17. The apparatus of claim 1, wherein the processor is further configured to change a page size of a portion of the physical memory that backs the identified range of virtual memory.

18. The apparatus of claim 17, wherein the page size of the portion of the physical memory that backs the identified range of virtual memory is reduced.

* * * * *